(12) United States Patent
Yuan et al.

(10) Patent No.: US 12,353,890 B2
(45) Date of Patent: Jul. 8, 2025

(54) NETWORK DEVICE DRIVER FILE GENERATING SYSTEM, METHOD, DEVICE, AND MEDIUM

(71) Applicant: CHINA UNIONPAY CO., LTD., Shanghai (CN)

(72) Inventors: Hang Yuan, Shanghai (CN); Gaolei Zhang, Shanghai (CN); Yongkai Zhou, Shanghai (CN); Pengfei Gao, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/723,660

(22) PCT Filed: Aug. 10, 2022

(86) PCT No.: PCT/CN2022/111496
§ 371 (c)(1),
(2) Date: Jun. 24, 2024

(87) PCT Pub. No.: WO2023/115981
PCT Pub. Date: Jun. 29, 2023

(65) Prior Publication Data
US 2025/0004787 A1 Jan. 2, 2025

(30) Foreign Application Priority Data
Dec. 24, 2021 (CN) .......................... 202111602639.3

(51) Int. Cl.
*G06F 9/4401* (2018.01)
(52) U.S. Cl.
CPC .................... *G06F 9/4411* (2013.01)
(58) Field of Classification Search
CPC ...................................................... G06F 9/4411
See application file for complete search history.

(56) References Cited

U.S. PATENT DOCUMENTS

| 10,277,461 B1 | 4/2019 | Juniper |
| 2009/0210523 A1 | 8/2009 | Duggan |
| 2022/0255818 A1* | 8/2022 | Zhang ................. H04L 63/0435 |

FOREIGN PATENT DOCUMENTS

| CN | 110890981 A | 3/2020 |
| CN | 113438100 A | 9/2021 |

OTHER PUBLICATIONS

International Application No. PCT/CN2022/111496, Written Opinion, mailed Oct. 28, 2022.

(Continued)

*Primary Examiner* — Glenn A. Auve
(74) *Attorney, Agent, or Firm* — MARSHALL, GERSTEIN & BORUN LLP

(57) ABSTRACT

The present disclosure relates to a network operation and maintenance technology, and in particular to a system and method for generating network device driver files. One aspect of the present disclosure provides a system for generating network device driver files. The system includes: a network device capability model construction unit, configured to construct a capability model following a standard format on the basis of a capability set acquired from a network device; a driver function interface generation unit, configured to generate, based on the capability model, a driver function interface that can be called by an upper-layer application; and a control message generation unit, configured to receive configuration data from the upper-layer application via the generated driver function interface, and to generate, based on the configuration data, a control message for driving the network device.

20 Claims, 2 Drawing Sheets

(56) References Cited

OTHER PUBLICATIONS

International Application No. PCT/CN2022/111496, International Search Report, dated Oct. 28, 2022.

* cited by examiner

NETWORK DEVICE DRIVER FILE GENERATING SYSTEM, METHOD, DEVICE, AND MEDIUM

CROSS-REFERENCE TO RELATED APPLICATIONS

The present application is a U.S. national stage of International Application No. PCT/CN2022/111496, filed Aug. 10, 2022, which claims priority to Chinese Patent Application No. CN202111602639.3, filed Dec. 24, 2021, entitled "System, Method, Device, and Medium for Generating Network Device Driver Files", the disclosures of which are incorporated herein by reference in their entirety for all purposes.

FIELD

The present application relates to a system, method and computer device for generating network device driver files, and a computer readable storage medium for implementing the above method.

BACKGROUND

With the rapid development of the Internet, various fields such as online shopping, social media, online entertainment, mobile payment, and local life are inseparable from network operation and maintenance services of data centers, which brings about both opportunities and challenges to the automation process of network operation and maintenance of data centers.

During the process of network operation and maintenance of data centers, it is necessary to implement operation and maintenance of network devices through network device drivers. However, currently most network device drivers are developed using hard-coded methods, resulting in a very heavy workload for specific driving processes. Additionally, as network operation and maintenance services continue to evolve, corresponding network device drivers are constantly being updated, leading to high maintenance costs and impacting network stability.

SUMMARY

According to one aspect of the present disclosure, there is provided a system for generating network device driver files. The system comprises: a network device capability model construction unit, configured to construct a capability model following a standard format on the basis of a capability set acquired from a network device; a driver function interface generation unit, configured to generate, based on the capability model, a driver function interface that can be called by an upper-layer application; and a control message generation unit, configured to receive configuration data from the upper-layer application via the generated driver function interface, and to generate, based on the configuration data, a control message for driving the network device.

According to another aspect of the present disclosure, there is provided a method for generating network device driver files. The method comprises the following steps performed at a computer device: A. constructing a capability model following a standard format on the basis of a capability set acquired from a network device; B. generating, based on the capability model, a driver function interface that can be called by an upper-layer application; and C. receiving configuration data from the upper-layer application via the generated driver function interface, and generating, based on the configuration data, a control message for driving the network device.

According to yet another aspect of the present disclosure, there is provided a computer device, comprising: a memory; a processor; and a computer program stored on the memory and executable on the processor. The computer program is executed to perform the following operations: A. constructing a capability model following a standard format on the basis of a capability set acquired from a network device; B. generating, based on the capability model, a driver function interface that can be called by an upper-layer application; and C. receiving configuration data from the upper-layer application via the generated driver function interface, and generating, based on the configuration data, a control message for driving the network device.

According to still another aspect of the present disclosure, there is provided a computer readable storage medium, with a computer program stored thereon, wherein the computer program, when executed by a processor, performs the method for generating network device driver files.

In some embodiments, in response to the constant evolvement of network operation and maintenance services of data centers, by deploying a system for generating network device driver files, it is possible to automatically generate driver files of a network device after establishing a connection with the network device without manual development, which significantly improves the network device driver efficiency. Meanwhile, by constructing a capability model following a standard format on the basis of a capability set acquired from the network device, the network device driver files generated above would be suitable for full-function drivers of various network devices, and can cope with flexible and changing operation and maintenance requirements without frequent maintenance and upgrading of drivers, thereby further improving the network device driver efficiency and network stability.

BRIEF DESCRIPTION OF THE DRAWINGS

The above and/or other aspects and advantages of the present disclosure will become clearer and easier to understand in conjunction with the following description in various aspects of the drawings. The same or similar units in the drawings are represented by the same reference numerals. The drawings include.

DETAILED DESCRIPTION OF EMBODIMENTS

The present disclosure will be more fully described hereinafter with reference to the drawings of the exemplary embodiments of the present disclosure. However, the present disclosure may be implemented in different forms, and should not be construed as being limited only by the various embodiments provided herein. The various embodiments aim to make the present disclosure more comprehensive and complete, so that the protection scope of the present disclosure would be more fully conveyed to a person skilled in the art.

In this specification, the terms such as "comprising" and "including" indicate that in addition to the units and steps directly and clearly stated in the specification and claims, the technical solution of the present disclosure also does not exclude the circumstances where there are other units and steps that are not directly or explicitly stated.

The terms such as "first" and "second" do not indicate the sequence of units in such aspects as time, space, size, etc., but are only used to distinguish between units.

In this specification, the network device may include, but is not limited to, computers (personal computers or servers), repeaters, bridges, routers, gateways, firewalls, switches and other devices.

In this specification, the term "network configuration protocol" refers to a network protocol to abide by when configuring various operating parameters of a network device. This protocol provides a mechanism for managing network device configuration. With this mechanism, it is possible to add, modify, and delete the configuration of a network device, and acquire configuration and status information of the network device. The network configuration protocol may be based on Extensible Markup Language, and examples of such protocol include the NetConf protocol.

Figure 1:
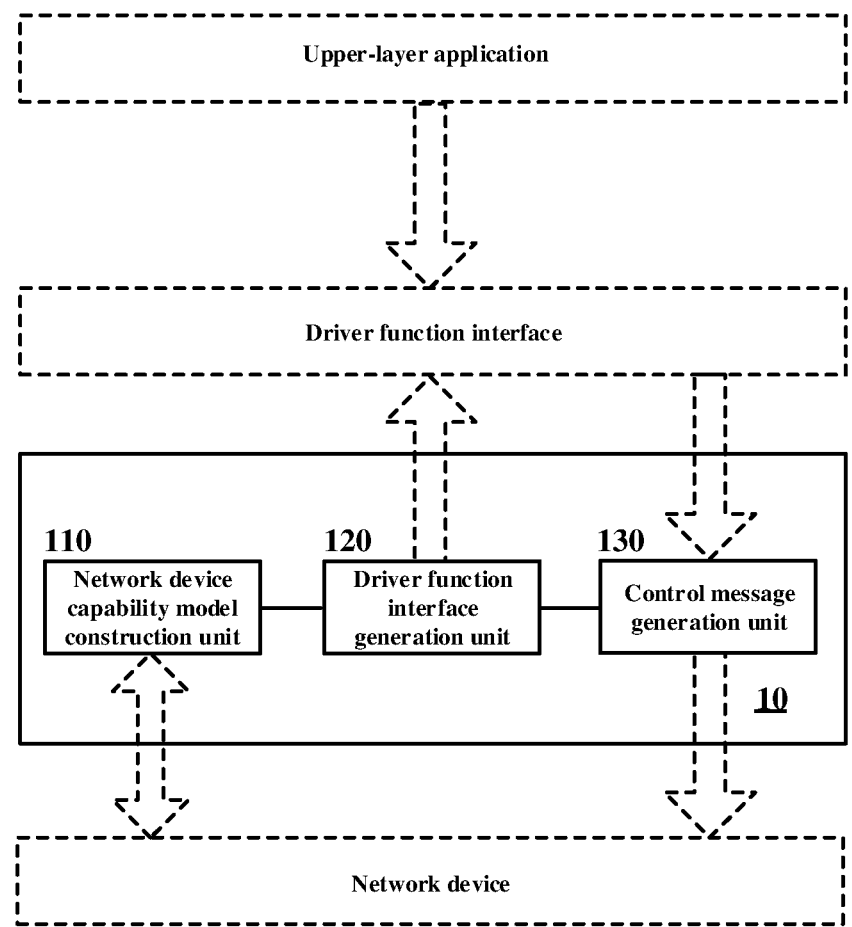
FIG. 1 shows a schematic block diagram of a system for generating network device driver files according to some embodiments of the present disclosure.

FIG. 1 shows a schematic block diagram of a system for generating network device driver files according to some embodiments of the present disclosure. The system 10 for generating network device driver files as illustrated in FIG. 1 include a network device capability model construction unit 110, a driver function interface generation unit 120 and a control message generation unit 130.

The network device capability model construction unit 110 is configured to construct a capability model following a standard format on the basis of a capability set acquired from a network device. Exemplarily, a capability set of a network device may include, but is not limited to, authentication, port configuration, routing configuration, access control list configuration, etc.

Optionally, the network device capability model construction unit 110 may be configured to construct a capability model following a standard format through the following steps: establishing a connection with the network device through a secure network protocol; sending to the network device, via the established connection, a first message requesting the return of the capability set of the network device, the first message being based on a network configuration protocol; receiving a second message from the network device, the second message being based on the network configuration protocol and comprising the capability set of the network device represented in the form of Extensible Markup Language; and constructing a capability model from the received capability set of the network device, using a data modeling language associated with the network configuration protocol.

Exemplarily, the operation of establishing a connection with the network device through a secure network protocol may be implemented as the following code function:

```
self.manager = manager.connect_ssh(host=host,
    port=port,username=username,
    password=password, timeout=120,
    self.manager.connected.
```

Exemplarily, the operation of sending to the network device, via the established connection, a first message requesting the return of the capability set of the network device may be implemented as the following code function:

```
def get_schema_files(self):
request = '''
<filter type="subtree">
<netconf-state xmlns="urn:ietf:params:xml:ns:yang:ietf-netconf-monitoring"><schemas/></netconf-state>
</filter>'''
reply = self.manager.get(request).
```

Exemplarily, the second message received from the network device, based on the network configuration protocol and comprising the capability set of the network device represented in the form of Extensible Markup Language, may be illustrated as follows:

```
Connected to xxxxxx yang CE5855 NETCONF server: 172.18.165.16:22
Get NETCONF State Reply:
    <?xml version="1.0" encoding="UTF-8"?> <data xmlns="urn:ietf:params:xml:ns:netconf:base:1.0">
      <netconf-state xmlns="urn:ietf:params:xml:ns:yang:ietf-netconf-monitoring">
        <schemas>
          <schema>
            <identifier>xxxxxx -aaa</identifier>
            <version>2018-11-23</version>
            <format>yang</format>
            <namespace>http://www.xxxxxx.com/netconf/vrp/xxxxxx-aaa</namespace>
            <location>NETCONF</location>
          </schema>
          <schema>
            <identifier>xxxxxx -aaa-action</identifier>
            <version>2018-11-23</version>
            <format>yang</format>
            <namespace>http://www.xxxxxx.com/netconf/vrp/xxxxxx-aaa</namespace>
            <location>NETCONF</location>
          </schema>
```

By representing the capability set of the network device in the form of Extensible Markup Language with powerful data representation capabilities, the network device capability model construction unit 110 can construct a capability model for the capability set of the network device more efficiently.

Exemplarily, the operation of constructing a capability model from the received capability set of the network device, using a data modeling language associated with the network configuration protocol (such as YANG data modeling language) may be implemented as the following code function:

(1) obtaining a detailed description of various capabilities one by one, based on the second message comprising the capability set of the network device represented in the form of Extensible Markup Language as received from the network device:

```
def get_xml_attrs(self, attr):
all_xml_attrs = {
"xxxxxx": 'xmlns="http://www.xxxxxx.com/netconf/vrp"
format-version="1.0"
content-version="1.0"',
"xxxxxxyang": 'xmlns="http://www.xxxxxx.com/netconf/vrp/"'+ attr
reply = self.manager.get(request)
}
```

(2) constructing a capability model based on the detailed description of various capabilities, using YANG data modeling language. For instance, the following provides an example of a YANG model constructed for VLAN capability:

As illustrated above, the capability model may include, but is not limited to, the following elements: capability paths, dependencies between capability models, and field descriptions of capabilities.

YANG data modeling language, as a data modeling language dedicated to network configuration protocols, is to design operable configuration data, status data models, remote call models and notification mechanisms for network configuration protocols. By using the YANG data modeling language to clearly define the data structure and its constraints, it is possible to perform data description of various network device capabilities in a more flexible and comprehensive manner.

```
module xxxxxx-vlan { namespace "http://www.xxxxxx.com/netconf/vrp/xxxxxx-vlan"    Capability path import xxxxxx.pub-type {
   prefix pub-type;
}
import xxxxxx-ifm {
   prefix ifm;                                               Dependencies on other capability models
}
import xxxxxx-extension {
   prefix ext;
} container vlan {
   description
      "VLAN management";
   container vlans {
      description
         "VLAN list";
      list vlan {
         key "vlanId";
         max-elements 4094;
         description
            "VLAN information";
         leaf vlanId {
            type vlanId {
               range "1..4094";
            }
            description
               "VLAN ID.";
         }
         leaf vlanName {
            type string {
               length "1..31";
            }
            must "not(../vlanType='carrier' or ../vlanType='fcoe')";
            description
               "VLAN name.";
            ext:allowDelete "true";                          Field
         }                                                   descriptions
         leaf vlanDesc {
            type string {
               length "1..80";
            }
            must "not(../vlanType='carrier' or ../vlanType='fcor')";
            description
               "VLAN description.";
            ext:allowDelete "true";
         }
         leaf vlanType {
            type vlanType;
            must "((../vlanType='common' or ../vlanType='super' or ../vlanType='princiapl') ))";
            default "common";
            description
               "VLAN type, such as common VLANs, super VLANS, and sub-VLANs. ";
         }
```

The driver function interface generation unit 120 is configured to generate, based on the capability model, a driver function interface that can be called by an upper-layer application. Optionally, the driver function interface generation unit 120 may be configured to generate a driver function interface through the following steps: parsing the constructed capability model to obtain remote procedure call information of the driver function interface associated with the constructed capability model; and generating a corresponding driver function interface based on the remote procedure call information.

Exemplarily, the remote procedure call information of the driver function interface is illustrated as follows:

```
rpc CreateVlan{
    description
        "ADD VLAN IN DEVICE.";
    input {
        leaf vlanId {
            type vlanId;
            mandatory true;
            description
                "VLAN ID.";
        }
        leaf desc{
            type string;
            description
                "Vlan description. ";
        }
    }
    output{
        leaf result{
            type string;
        }
    }
}.
```

The driver function interface generation unit 120 may generate a corresponding driver function interface based on the remote procedure call information of the above driver function interface. Optionally, the driver function interface associated with the constructed capability model may include, but is not limited to: a creation interface, a deletion interface, an update interface and a query interface.

Exemplarily, YANG data modeling language has standardized requirements and logic dedicated to construct a driver function interface. For instance, the capability-related field descriptions in the capability model constructed using the YANG data modeling language have a corresponding relationship to the fields in the input section of the remote procedure call information of the driver function interface. The fields in the output section of the remote procedure call information of the driver function interface, on the other hand, provide a universally applicable construction process that can be applied to a wider range of driver function interfaces. By utilizing the corresponding relationship between the capability-related field descriptions in the capability model constructed using the YANG data modeling language and the fields in the input section of the remote procedure call information of the driver function interface, the driver function interface generation unit 120 may generate a driver function interface based on the capability model.

After the corresponding driver function interface is generated, the upper-layer application may input configuration data via the driver function interface. Exemplarily, the input configuration data is as follows:

```
input {
    leaf vlanId {
```

-continued

```
        value 2;
    }
    leaf desc{
        value "";
    }
}.
```

By transmitting messages defined in the form of Extensible Markup Language between the network device capability model construction unit 110 and the network device based on the network configuration protocol, it is not only convenient to construct a universally applicable network device capability model, but also can meet requirements of interoperability between different network device manufacturers. In addition, establishing a connection with the network device through a secure network protocol set by the network configuration protocol ensures security of message transmission.

The control message generation unit 130 is configured to receive configuration data from the upper-layer application via the generated driver function interface, and to generate, based on the configuration data, a control message for driving the network device. Optionally, the control message generation unit 130 is configured with standardized control message generation logic. Optionally, the control message generation unit 130 may be further configured to: generate a control message based on the configuration data, using the standardized control message generation logic; and send the generated control message down to the network device, so that the network device performs a driver operation.

Optionally, the standardized control message generation logic includes, but is not limited to, the following elements: capability paths corresponding to those in the capability model, operation types corresponding to the driver function interface, an operation target library, and field structures corresponding to those in the capability model.

Exemplarily, the standardized control message generation logic may include the following four elements:

(1) Capability Paths

This element is obtained from the capability model constructed above. During the construction of the capability model, the network device capability model construction unit 110 reserves corresponding capability paths for various functions of the network device. For example, the capability path of the aforementioned model constructed for VLAN capability is:

http://www.xxxxxx.com/netconf/vrp/xxxxxx-vlan (2) Operation Types

The operation types may include two categories, i.e. editing and querying, which are represented by the keywords edit-config and get-config respectively. Taking VLAN capability as an example, the corresponding relationship between the above-mentioned creation interface, deletion interface, update interface and query interface, and the operation types is as follows:

| Interface Types | Operation Types |
| --- | --- |
| Creation interface | edit-config |
| Deletion interface | |
| Update interface | |
| Query interface | get-config |

Among them, the edit-config corresponding to the creation interface, deletion interface and update interface is used to modify specified configuration data. Examples of the modification include a merge operation, a substitution operation, a creation operation and a deletion operation. The get-config corresponding to the query interface is used to query configuration data.

(3) Operation Target Library

The operation target library may include two categories, namely, a runtime library and a verification library, which are represented by the keywords running and candidate respectively. Among them, the runtime library is used to store the configuration data that has currently taken effect, while the verification library is used to store the configuration data that may be submitted to take effect.

(4) Field Structures

This element corresponds to the field structures in the constructed capability model mentioned above. Therefore, it is possible to set up network configuration protocol control message field interfaces based on the constructed capability model in order to populate corresponding data.

Take adding the VLAN capability as an example. The corresponding control message is generated as follows:

```
<rpc
 xmlns:vlan="http://www.xxxxxx.com/netconf/vrp/xxxxxx-vlan">
   <edit-config>
     <target>
       <running/>
     </target>
     <config>
       <vlan
 xmlns="http://www.xxxxxx.com/netconf/vrp/xxxxxx-vlan">
         <vlans>
           <vlan>
             <vlanId>7</vlanId>
           </vlan>
         </vlans>
       </vlan>
     </config>
   </edit-config>
</rpc>.
```

After the control message is generated, it is sent down to the network device, so that the network device performs a driver operation.

The system for generating network device driver files according to one aspect of the present disclosure can automatically generate driver files of a network device after establishing a connection with the network device without manual development, which significantly improves the network device driver efficiency. Meanwhile, by constructing a capability model following a standard format on the basis of a capability set acquired from the network device, the network device driver files generated above would be suitable for full-function drivers for various network devices, and can cope with flexible and changing operation and maintenance requirements without frequent maintenance and upgrading of drivers, thereby further improving the network device driver efficiency and network stability.

Figure 2:
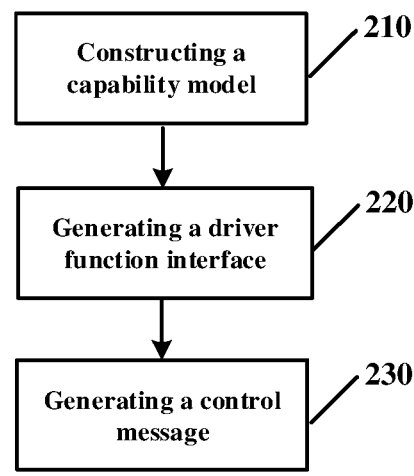
FIG. 2 shows a flowchart of a method for generating network device driver files according to some embodiments of the present disclosure.

FIG. 2 shows a flowchart of a method for generating network device driver files according to some embodiments of the present disclosure.

Figure 3:
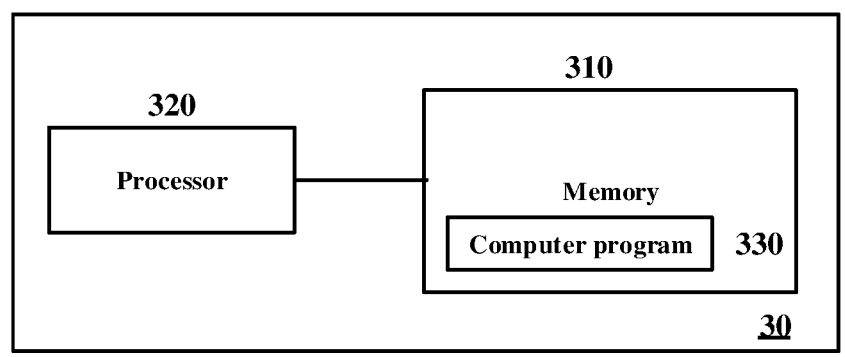
FIG. 3 shows a block diagram of a typical computer device.

In these embodiments, the steps in the method procedure may be implemented by means of the computer device shown in FIG. 3 or the system 10 for generating network device driver files shown in FIG. 1.

In step 210, a capability model following a standard format is constructed on the basis of a capability set acquired from a network device.

Optionally, a capability model following a standard format may be constructed through the following steps: establishing a connection with the network device through a secure network protocol; sending to the network device, via the established connection, a first message requesting the return of the capability set of the network device, the first message being based on a network configuration protocol; receiving a second message from the network device, the second message being based on the network configuration protocol and comprising the capability set of the network device represented in the form of Extensible Markup Language; and constructing a capability model from the received capability set of the network device, using a data modeling language associated with the network configuration protocol.

By representing the capability set of the network device in the form of Extensible Markup Language with powerful data representation capabilities, it is possible to construct a capability model for the capability set of the network device more efficiently.

Exemplarily, constructing a capability model from the received capability set of the network device, using a data modeling language associated with the network configuration protocol (i.e., YANG data modeling language) may comprise the following steps:

(1) obtaining a detailed description of various capabilities one by one, based on the second message comprising the capability set of the network device represented in the form of Extensible Markup Language as received from the network device; and (2) constructing a capability model based on the detailed description of various capabilities, using YANG data modeling language. For example, a YANG model may be constructed for VLAN capability. The capability model may include, but is not limited to, the following elements: capability paths, dependencies between capability models, and field descriptions of capabilities.

YANG data modeling language, as a data modeling language dedicated to network configuration protocols, is to design operable configuration data, status data models, remote call models and notification mechanisms for network configuration protocols. By using the YANG data modeling language to clearly define the data structure and its constraints, it is possible to perform data description of various network device capabilities in a more flexible and comprehensive manner.

In step 220, a driver function interface that can be called by an upper-layer application is generated based on the capability model. Optionally, a driver function interface may be generated through the following steps: parsing the constructed capability model to obtain remote procedure call information of the driver function interface associated with the constructed capability model; and generating a corresponding driver function interface based on the remote procedure call information.

Optionally, the driver function interface associated with the constructed capability model comprises one or more of the following: a creation interface, a deletion interface, an update interface and a query interface.

After the corresponding driver function interface is generated, the upper-layer application may input configuration data via the driver function interface.

By transmitting messages defined in the form of Extensible Markup Language based on the network configuration protocol, it is not only convenient to construct a universally applicable network device capability model, but also can meet requirements of interoperability between different network device manufacturers. In addition, establishing a connection with the network device through a secure network protocol set by the network configuration protocol ensures security of message transmission.

In step 230, configuration data is received from the upper-layer application via the generated driver function interface, and a control message for driving the network device is generated based on the configuration data. Optionally, the step 230 may comprise: generating a control message based on the configuration data, using the standardized control message generation logic; and sending the generated control message down to the network device, so that the network device performs a driver operation.

Optionally, the standardized control message generation logic includes, but is not limited to, the following elements: capability paths corresponding to those in the capability model, operation types corresponding to the driver function interface, an operation target library, and field structures corresponding to those in the capability model.

After the control message is generated, it is sent down to the network device, so that the network device performs a driver operation.

The method for generating network device driver files according to one aspect of the present disclosure can automatically generate driver files of a network device after establishing a connection with the network device without manual development, which significantly improves the network device driver efficiency. Meanwhile, by constructing a capability model following a standard format on the basis of a capability set acquired from the network device, the network device driver files generated above would be suitable for full-function drivers for various network devices, and can cope with flexible and changing operation and maintenance requirements without frequent maintenance and upgrading of drivers, thereby further improving the network device driver efficiency and network stability.

FIG. 3 shows a block diagram of a typical computer device. The computer device 30 illustrated in FIG. 3 may be used for performing the method for generating network device driver files described in FIG. 2.

Referring to FIG. 3, the computer device 30 includes a memory 310 (for example, a non-volatile memory such as flash memory, ROM, hard drive, magnetic disk and optical disk), a processor 320, and a computer program 330 stored on the memory 310 and executable on the processor 320.

The memory 310 stores the computer program 330 executable on the processor 320. The processor 320 is configured to execute the computer program 330 to implement the corresponding method procedure for generating network device driver files.

According to another aspect of the present disclosure, there is also provided a computer readable storage medium, with a computer program stored thereon, wherein the computer program, when executed by a processor, performs the method procedure for generating network device driver files.

Here, various forms of a computer storage medium, such as disk-type (e.g., disk, CD-ROM, etc.), card-type (e.g., memory card, optical card, etc.), semiconductor memory-type (e.g., ROM, non-volatile memory, etc.), and tape-type (e.g., tape, cassette tape, etc.), may serve as the computer readable storage medium.

Where applicable, hardware, software, or a combination of hardware and software may be used to implement various embodiments provided in the present disclosure. Furthermore, where applicable, various hardware components and/or software components set forth herein may be combined into composite components including software, hardware, and/or both, without departing from the scope of the present disclosure. Where applicable, various hardware components and/or software components set forth herein may be divided into sub-components including software, hardware, or both, without departing from the scope of the present disclosure. In addition, where applicable, it can be anticipated that software components could be implemented as hardware components, and vice versa.

The software (for example, program codes and/or data) according to the present disclosure may be stored on one or more computer storage medium. It can also be anticipated that the software identified herein could be implemented using one or more general-purpose or special-purpose computers and/or computer systems, whether networked and/or otherwise. Where applicable, the sequence of individual steps described herein may be modified, or combined into compound steps, and/or divided into sub-steps to deliver the features described herein.

The embodiments and examples are provided herein to best explain the embodiments of the technology and its particular application, so that a person skilled in the art can exploit and implement the present disclosure. However, a person skilled in the art will appreciate that the foregoing description and examples are provided for the purpose of illustration and exemplification only. The description provided is not intended to cover every aspect of the present application or to limit the present application to the precise form disclosed.

In view of the foregoing, the scope of the present application is determined by the following claims.

The invention claimed is:

1. A method for generating network device driver files, comprising the following steps performed at a computer device:
   A. constructing a capability model following a standard format based on a capability set of a network device;
   B. generating, based on the capability model, a driver function interface that can be called by an upper-layer application; and
   C. receiving configuration data from the upper-layer application via the generated driver function interface, and generating, based on the configuration data, a control message for driving the network device.

2. The method according to claim 1, wherein the step A comprises:
   A1. establishing a connection with the network device through a secure network protocol;
   A2. sending to the network device, via the established connection, a first message requesting the capability set of the network device, the first message being based on a network configuration protocol;
   A3. receiving a second message from the network device, the second message being based on the network configuration protocol and comprising the capability set of the network device represented in the form of Extensible Markup Language; and
   A4. constructing a capability model from the capability set of the network device, using a data modeling language associated with the network configuration protocol.

3. The method according to claim 2, wherein the data modeling language associated with the network configuration protocol is YANG data modeling language.

4. The method according to claim 1, wherein the capability model comprises one or more of the following elements: capability paths, dependencies between capability models, and field descriptions of capabilities.

5. The method according to claim 1, wherein the step B comprises:
- B1. parsing the constructed capability model to obtain remote procedure call information of the driver function interface associated with the constructed capability model; and
- B2. generating a corresponding driver function interface based on the remote procedure call information.

6. The method according to claim 5, wherein the driver function interface associated with the constructed capability model comprises one or more of the following: a creation interface, a deletion interface, an update interface and a query interface.

7. The method according to claim 1, wherein the step C comprises:
- C1. generating a control message based on the configuration data, using a standardized control message generation logic; and/or
- C2. sending the generated control message down to the network device, so that the network device performs a driver operation.

8. The method according to claim 7, wherein the standardized control message generation logic comprises one or more of the following elements: capability paths corresponding to those in the capability model, operation types corresponding to the driver function interface, an operation target library, and field structures corresponding to those in the capability model.

9. The method according to claim 8, wherein the operation target library comprises a runtime library and a verification library.

10. The method according to claim 8, wherein the operation types corresponding to the driver function interface comprise editing and querying.

11. A non-transitory computer readable storage medium, with a computer program stored thereon, wherein the computer program, when executed by a processor, performs the method according to claim 1.

12. A computer device, comprising:
- a memory;
- a processor; and
- a computer program stored on the memory and executable on the processor, the computer program being executed to perform the following operations:
- A. constructing a capability model following a standard format based on a capability set of a network device;
- B. generating, based on the capability model, a driver function interface that can be called by an upper-layer application; and
- C. receiving configuration data from the upper-layer application via the generated driver function interface, and generating, based on the configuration data, a control message for driving the network device.

13. The device according to claim 12, wherein the computer program is executed to perform step A in the following means:
- A1. establishing a connection with the network device through a secure network protocol;
- A2. sending to the network device, via the established connection, a first message requesting of the capability set of the network device, the first message being based on a network configuration protocol;
- A3. receiving a second message from the network device, the second message being based on the network configuration protocol and comprising the capability set of the network device represented in the form of Extensible Markup Language; and
- A4. constructing a capability model from the capability set of the network device, using a data modeling language associated with the network configuration protocol.

14. The device according to claim 13, wherein the data modeling language associated with the network configuration protocol is YANG data modeling language.

15. The method according to claim 12, wherein the capability model comprises one or more of the following elements: capability paths, dependencies between capability models, and field descriptions of capabilities.

16. The device according to claim 12, wherein the computer program is executed to perform step B in the following means:
- B1. parsing the constructed capability model to obtain remote procedure call information of the driver function interface associated with the constructed capability model; and
- B2. generating a corresponding driver function interface based on the remote procedure call information.

17. The device according to claim 16, wherein the driver function interface associated with the constructed capability model comprises one or more of the following: a creation interface, a deletion interface, an update interface and a query interface.

18. The device according to claim 12, wherein the computer program is executed to perform step C in the following means:
- C1. generating a control message based on the configuration data, using a standardized control message generation logic; and/or
- C2. sending the generated control message down to the network device, so that the network device performs a driver operation.

19. The device according to claim 18, wherein the standardized control message generation logic comprises one or more of the following elements: capability paths corresponding to those in the capability model, operation types corresponding to the driver function interface, an operation target library, and field structures corresponding to those in the capability model.

20. The method according to claim 19, wherein the operation target library comprises a runtime library and a verification library.

* * * * *